United States Patent
Delaney et al.

(10) Patent No.: US 8,303,866 B2
(45) Date of Patent: Nov. 6, 2012

(54) MASS PRODUCTION OF MICRO-OPTICAL DEVICES, CORRESPONDING TOOLS, AND RESULTANT STRUCTURES

(75) Inventors: William Delaney, Charlotte, NC (US); Paul Elliott, Charlotte, NC (US); David Keller, Charlotte, NC (US); William Hudson Welch, Charlotte, NC (US); Greg Kintz, Asheville, NC (US); Frolian Pobre, Charlotte, NC (US)

(73) Assignee: DigitalOptics Corporation East, Charlotte, NC (US)

( * ) Notice: Subject to any disclaimer, the term of this patent is extended or adjusted under 35 U.S.C. 154(b) by 0 days.

(21) Appl. No.: 12/081,871

(22) Filed: Apr. 22, 2008

(65) Prior Publication Data

US 2009/0034088 A1 Feb. 5, 2009

Related U.S. Application Data

(60) Provisional application No. 60/907,936, filed on Apr. 23, 2007.

(51) Int. Cl.
*B29D 11/00* (2006.01)
*G03F 7/004* (2006.01)
*G03F 7/20* (2006.01)

(52) U.S. Cl. ...... 264/1.32; 264/1.38; 264/220; 264/496; 264/293; 425/174.4

(58) Field of Classification Search .......... 264/1.38, 264/1.32, 220, 496, 293; 425/174.4
See application file for complete search history.

(56) References Cited

U.S. PATENT DOCUMENTS

| | | | | |
|---|---|---|---|---|
| 5,214,535 A * | 5/1993 | Harris et al. | | 359/565 |
| 5,227,915 A * | 7/1993 | Grossinger et al. | | 359/565 |
| 5,453,876 A * | 9/1995 | Hamada | | 359/625 |
| 5,494,783 A * | 2/1996 | Harris | | 430/321 |
| 5,670,096 A * | 9/1997 | Lu | | 264/1.1 |
| 6,649,008 B2 * | 11/2003 | Feldman et al. | | 156/250 |
| 6,730,459 B2 * | 5/2004 | Nishikawa et al. | | 430/321 |
| 6,800,225 B1 | 10/2004 | Hagmann et al. | | |
| 7,094,304 B2 * | 8/2006 | Nystrom et al. | | 156/242 |
| 7,391,458 B2 * | 6/2008 | Sakamoto | | 348/340 |
| 7,473,088 B2 * | 1/2009 | Ho et al. | | 425/174.4 |
| 8,120,858 B2 * | 2/2012 | Choi et al. | | 359/642 |
| 2002/0145807 A1 * | 10/2002 | Nishikawa | | 359/619 |
| 2003/0115907 A1 * | 6/2003 | Patton et al. | | 65/106 |
| 2004/0232105 A1 * | 11/2004 | Kaise et al. | | 216/26 |
| 2006/0056034 A1 * | 3/2006 | Tsuruma | | 359/626 |

(Continued)

FOREIGN PATENT DOCUMENTS

CN  1108999 A1  9/1995

(Continued)

OTHER PUBLICATIONS

Chinese Office action dated Jul. 2, 2012 (William Delaney, et al.).

*Primary Examiner* — Joseph Del Sole
*Assistant Examiner* — Nahida Sultana
(74) *Attorney, Agent, or Firm* — Lee & Morse, P.C.

(57) ABSTRACT

A micro-optical element includes a support substrate, a micro-optical lens in a cured replication material on a first surface of the support substrate, and an opaque material aligned with and overlapping the micro-optical lens along a vertical direction.

27 Claims, 10 Drawing Sheets

U.S. PATENT DOCUMENTS

| | | | |
|---|---|---|---|
| 2006/0215269 A1* | 9/2006 | Abe et al. | 359/619 |
| 2006/0273478 A1 | 12/2006 | Jin et al. | |
| 2006/0275018 A1* | 12/2006 | Chae | 385/147 |
| 2006/0290017 A1* | 12/2006 | Yanagisawa | 264/1.27 |
| 2007/0015090 A9* | 1/2007 | Shimizu | 430/321 |
| 2007/0065757 A1* | 3/2007 | Ogino et al. | 430/311 |
| 2007/0110361 A1* | 5/2007 | Harden et al. | 385/14 |
| 2007/0138699 A1* | 6/2007 | Wuister et al. | 264/319 |
| 2008/0113273 A1 | 5/2008 | Jin et al. | |
| 2009/0085255 A1* | 4/2009 | Tada et al. | 264/401 |
| 2009/0200710 A1* | 8/2009 | Khusnatdinov et al. | 264/496 |
| 2009/0212462 A1* | 8/2009 | Kruijt-Stegeman et al. | 264/297.4 |
| 2010/0078860 A1* | 4/2010 | Yoneda et al. | 264/496 |
| 2010/0233616 A1* | 9/2010 | Kobayashi et al. | 430/270.1 |

FOREIGN PATENT DOCUMENTS

| | | |
|---|---|---|
| DE | 10 2006 014 200 A1 | 12/2006 |
| EP | 0 637 490 A1 | 2/1995 |
| EP | 0663282 A1 * | 7/1995 |
| EP | 1460738 A2 * | 7/2002 |
| EP | 1 460 738 A2 | 9/2004 |
| EP | 1 460 738 A3 | 9/2004 |
| JP | 358096889 A * | 6/1983 |
| JP | 2002/210745 * | 6/2002 |
| JP | 2005 227679 A | 8/2005 |
| JP | 2006082536 A * | 3/2006 |

* cited by examiner

MASS PRODUCTION OF MICRO-OPTICAL DEVICES, CORRESPONDING TOOLS, AND RESULTANT STRUCTURES

CROSS REFERENCE TO RELATED APPLICATION(S)

This application is related to provisional application Ser. No. 60/907,936, filed Apr. 23, 2007, the entire contents of which is hereby incorporated by reference.

BACKGROUND

1. Field of the Invention

Embodiments of the present invention relate to manufacturing micro-optical devices. More particularly, embodiments of the present invention relate to mass production of micro-optical devices, corresponding tools and resultant structures.

2. Description of Related Art

Mass production of micro-optical devices including micro-lenses may be realized using replication processes or lithographic processes. Replication processes may include injection molding, hot embossing and ultra-violet (UV) embossing. Micro-lenses may be refractive, diffractive or a hybrid thereof. Typically micro-lenses have structures of such size that the wave nature of light has to be taken into account.

Currently, there is a demand for mass production of more complex micro-optical devices, i.e., micro-lenses having more complex optical prescriptions, e.g., aspheric lenses, and/or micro-lenses having additional features associated therewith.

SUMMARY OF THE INVENTION

Embodiments are therefore directed to a method of mass producing micro-optical devices, corresponding tools and resultant structures, which substantially overcome one or more of the problems due to the limitations and disadvantages of the related art.

At least one of the above and other features and advantages may be realized by providing a micro-optical element, including a support substrate, a micro-optical lens in a cured replication material on a first surface of the support substrate, and an opaque material aligned with and overlapping the micro-optical lens along a vertical direction.

The opaque material is adapted to serve as an aperture stop for the micro-optical lens. The micro-optical element may include a base of the cured replication material between the micro-optical lens and the support substrate.

The micro-optical element may include a feature separate from the micro-optical lens in the cured replication material. The feature may be a standoff.

The micro-optical element may include an adhesive layer outside the micro-optical lens and the opaque material. The micro-optical element may include cured replication material under the adhesive layer.

The micro-optical element may include another micro-optical lens in a cured replication material on a second surface of the support substrate, the second surface being opposite the first surface.

The opaque material may be on an upper surface of the micro-optical lens, between the micro-optical lens and the support substrate and/or on a second surface of the support substrate, the second surface being opposite the first surface.

At least one of the above and other features and advantages may be realized by providing a replication tool for use in replicating a micro-optical lens in a wavelength curable replication material, the replication tool including a transparent substrate having a first surface adapted to contact the replication material, and a mask opaque to wavelengths used to cure the replication material, the mask being on a second surface of the transparent substrate, opposite the first surface, and being adapted to expose at least a region corresponding to the micro-optical lens, such that the replication material can be cured through the transparent substrate.

The mask may extend from the region corresponding to the micro-optical lens. The mask may extend to a periphery of the transparent substrate. The mask may expose regions separate from the region corresponding to the micro-optical lens.

The transparent substrate may be a master substrate having negative structural features for forming the micro-optical lens. The transparent substrate may be a support substrate adapted to support the micro-optical lens.

At least one of the above and other features and advantages may be realized by providing a replication tool for use in replicating a micro-optical lens in a replication material, the replication tool including negative structural features for forming the micro-optical lens on a master substrate, and trenches in the master substrate surrounding the negative structural features.

The replication tool may include a mask opaque to wavelengths used to cure the replication material, the mask being on a surface of the master substrate opposite the negative structural features and the trenches, and being adapted to obscure at least a region corresponding to the trenches.

At least one of the above and other features and advantages may be realized by providing a method of mass-producing micro-optical lenses, including providing a replication material on a substrate having a concave micro-optical lens mold therein, planarizing the replication material, curing the replication material, removing at least a portion of the replication material from an upper surface of the substrate, and etching replication material in the concave micro-optical lens mold, thereby forming an aspheric micro-optical lens.

The removing may include removing a portion of the replication material in the concave micro-optical lens mold. The method may include providing additional replication material in the aspheric micro-optical lens mold, bringing a support substrate into contact with the additional replication material, curing the additional replication material to form a replica, and removing the support substrate with the replica from the substrate.

The method may include controlling a spread of the additional replication material. Controlling the spread may include using a deposition pen to supply the additional replication material, providing standoffs surrounding the micro-optical lens mold, and/or providing trenches surrounding the micro-optical lens mold.

Planarizing may include bringing a heated optical flat in contact with the replication material, the heated optical flat having a temperature sufficient to reflow the replication material.

At least one of the above and other features and advantages may be realized by providing a method of making a micro-optical device, including providing a replication material between a support substrate and a master substrate having structural features for forming a micro-optical lens, the replication material covering at least a portion of an opaque material on the support substrate, applying pressure to at least one of the support substrate and the master substrate, curing the replication material to form a replica including the micro-optical lens, and removing the support substrate including the opaque material and the replica.

Before applying pressure, the replication material may cover only a portion the opaque material, and, after applying pressure, the replication material completely covers the replication material.

Curing may include providing light through the master substrate. The master substrates may include one or more of PDMS and PTFE.

At least one of the above and other features and advantages may be realized by providing a method of making a micro-optical device, including providing a replication material between a support substrate and a master substrate having structural features for forming a micro-optical lens, at least one of the support substrate and the master substrate having a mask on a surface opposite that contacting the replication material, applying pressure to at least one of the support substrate and the master substrate, curing the replication material to form a replica including the micro-optical lens, curing including providing light through the surface having the mask, and removing the support substrate including the replica.

The mask may include two separate opaque features, and curing further cures a protrusion separate from the micro-optical lens. The mask may correspond to dicing lanes on the support substrate. The method may include removing any replication material not cured during the curing.

BRIEF DESCRIPTION OF THE DRAWINGS

The above and other features and advantages will become more apparent to those of ordinary skill in the art by describing in detail exemplary embodiments thereof with reference to the attached drawings, in which.

DETAILED DESCRIPTION OF THE INVENTION

The present invention will now be described with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" a substrate, it can be directly on the other layer or substrate, or intervening layers may also be present. Like reference numerals refer to like elements throughout.

As described in detail below, mass production of micro-optical devices in accordance with embodiments of the present invention may allow aspheric micro-optical lenses to be created and/or replicated, and/or may allow replication of micro-optical lenses in conjunction with additional features, e.g., stand-offs, alignment features, metal apertures, and cleared dicing lanes.

As used herein, "substrate" may be a single die having a micro-optical lens(es) or may include a plurality of dies having a corresponding plurality of lens(es). "Dicing lanes" may be used in conjunction with any suitable manner of separating dies, not just dicing.

A replication material may be a deformable but curable material, e.g., heat curable or light, e.g., ultraviolet (UV), curable. The curing process may be achieved in different manners, including for example through UV exposure, or anaerobic, chemical, or heat processes. Examples of replication materials include UV curable polymers, UV curable momomers, thermoplastics, thermosets and composite materials, e.g., sol-gel or FROM 128. Suitable replication techniques include UV embossing, hot embossing, nano-imprinting, etc.

A master may be made of a variety of materials capable of providing sufficient structural detail for the micro-optical device and sufficiently durable for multiple uses. For example, the master may be made of a material having some elasticity, but sufficient mechanical strength, e.g., polydimethylsiloxane (PDMS) or poly(tetrafluoroethylene) (PTFE), e.g., Teflon. The master may also be made of a rigid material, e.g., a metal alloy, such as a nickel alloy, a silicon or a ceramic. The master may be opaque to wavelengths needed to cure a replication material used, e.g., metal or metal alloys, or may be transparent to these wavelengths, e.g., PDMS, PTFE, silicon.

Figure 1A:
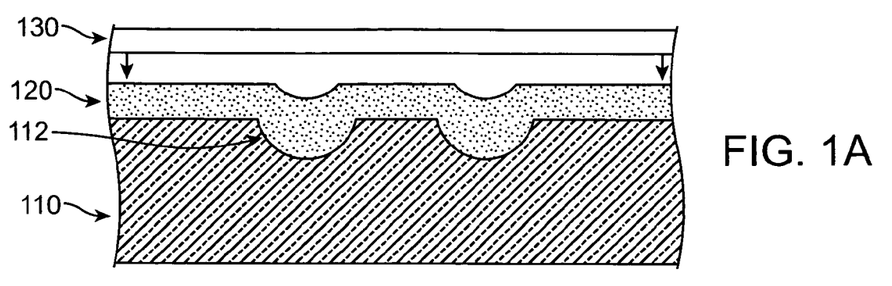
FIGS. 1A to 1C illustrate stages in a method of making a micro-optical element according to an embodiment of the present invention.
Figure 1B:
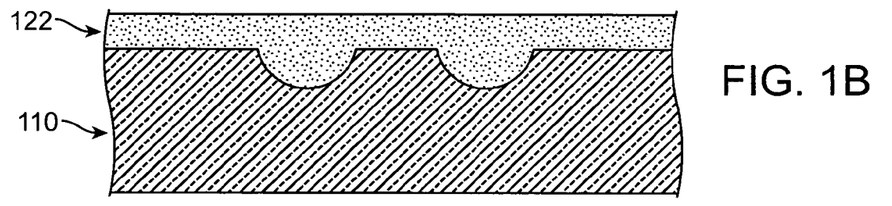
Figure 1C:
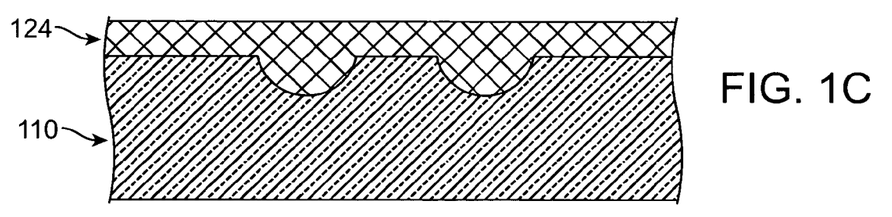

Referring to FIG. 1A, a master substrate 110, e.g., having concave lens molds 112 therein formed in accordance with known methods, may be coated with a replication material 120, e.g., spin coating or screen coating. When a sufficiently thick layer of replication material 120 is provided on the master substrate 110, the layer may be substantially flat. Such a thick layer may waste material and increase processing time. However, when the replication material 120 is thinner, the replication material may be insufficiently flat, as shown in FIG. 1A, in which an upper surface of the replication material 120 is uneven. As shown in FIG. 1B, a heated optical flat 130 may be brought into contact with the replication material 120, thereby reflowing the replication material 120, forming a planarized replication material 122. This planarized replication material 122 may then be cured in accordance with the properties of the particular replication material used to form a hardened replication material layer 124, as shown in FIG. 1C.

Figure 2A:
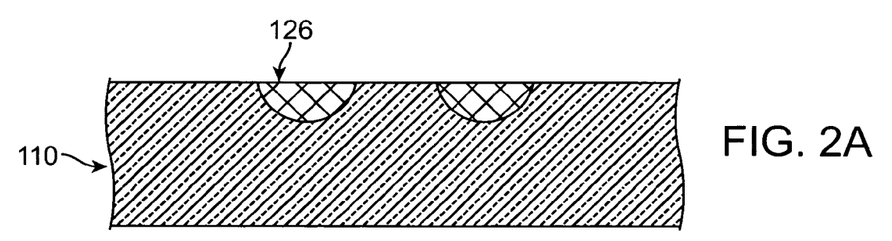
FIGS. 2A to 2B illustrate further stages in a method of making a micro-optical element from FIG. 1C according to an embodiment of the present invention.

Then, this hardened replication material layer 124 may be removed to leave just the concave lens molds 112 filled with replication material 126, as shown in FIG. 2A. This replication material 126 may then be reactive ion etched into the master substrate 110 to form an aspheric concave lens 114 in accordance with a desired optical prescription, as shown in FIG. 2B.

Figure 3A:
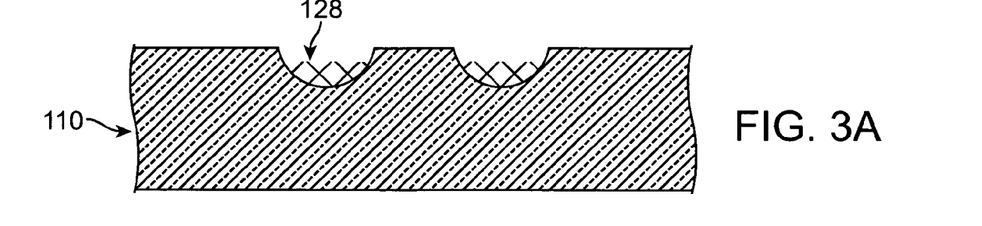
FIGS. 3A to 3B illustrate further stages in a method of making a micro-optical element from FIG. 1C according to another embodiment of the present invention.

Alternatively, referring to FIG. 3A, the hardened replication material 124 may be etched back to below an upper surface of the master substrate 110, leaving replication material 128 partially filling the concave lens molds 112. Then, the replication material 128 may be reactive ion etched into the master substrate 110 to form an aspheric concave lens 116 in accordance with a desired optical description, as shown in FIG. 3B.

Figure 2B:
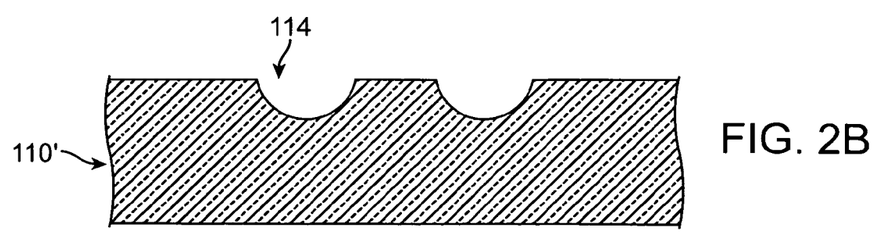
Figure 3B:
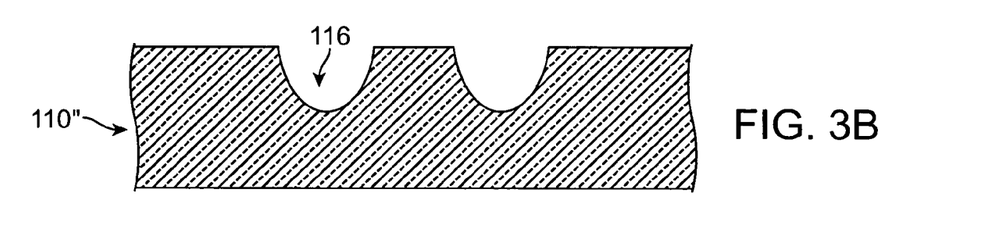
Figure 4A:
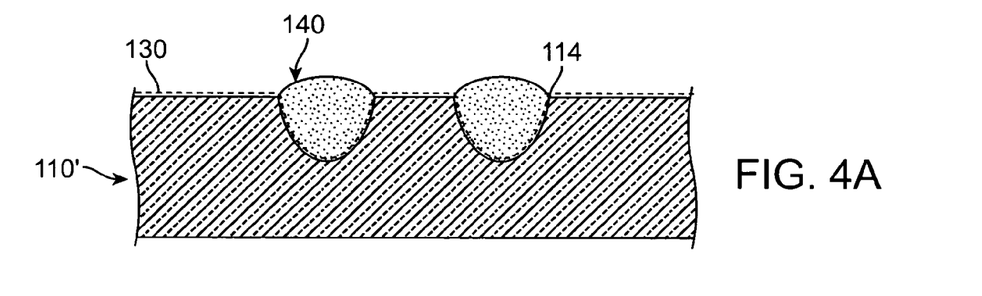
FIGS. 4A to 4D illustrate further stages in a method of making a micro-optical element from FIG. 2B according to an embodiment of the present invention.
Figure 4B:
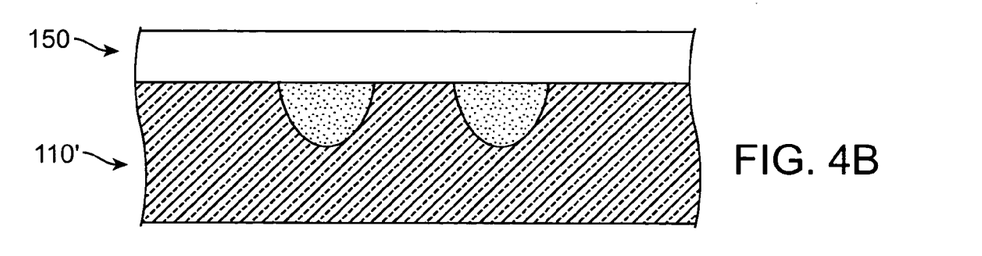
Figure 4C:
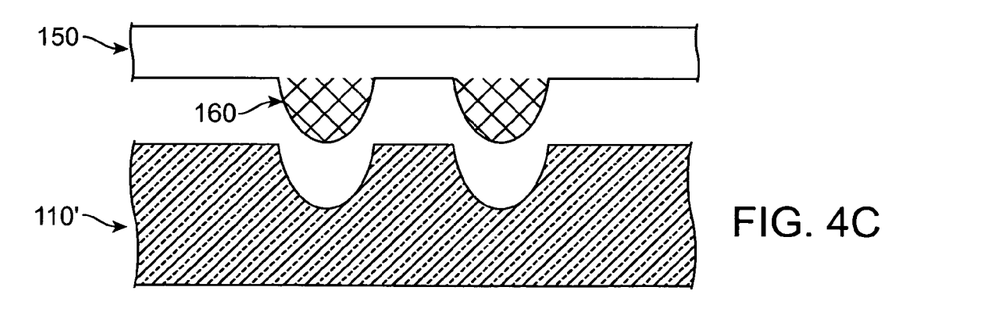
Figure 4D:
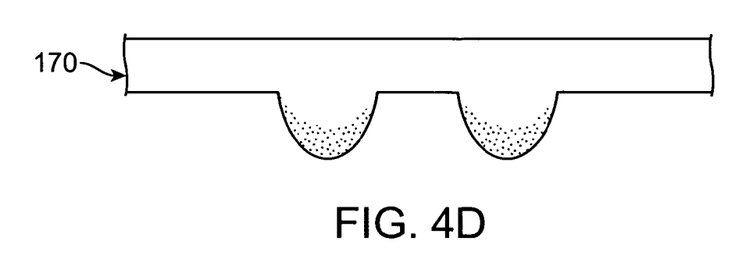

Either of the optical elements shown in FIG. 2B or 3B may be used as they are, or may serve as an aspheric master substrate 110', 110" for forming convex aspheric lenses. For example, as illustrated in FIG. 4A, a release layer 130 may be provided on the aspheric master substrate 110' of FIG. 2B. Then, as shown in FIG. 4B, the aspheric lenses 114 in the aspheric master substrate 110' may be filled with a replication material 140, e.g., using a precise deposition technique, e.g., using a dispensing pen. Referring to FIG. 4B, a support substrate 150 may be brought into contact with the replication material 140 using pressure and precise alignment, and the replication material 140 may then be cured to form a replica 160. The replica 160 may then be removed from the master substrate 110', as shown in FIG. 4C, while adhering to the support substrate 150. This replica 160 may then be used as is, or may be transferred into the support substrate 150 in accordance with known techniques to form a final optical element 170, as shown in FIG. 4D.

The control of deposition of the replication material may be further realized by providing features for controlling the spread of the replication material. This may allow use of less accurate provision and/or a controlled height of base layer under the lens. Such controlled height may be of particular importance when the replica is to be transferred into the support substrate, since having as little extra material as possible may speed up and simplify the transfer.

Figure 5A:
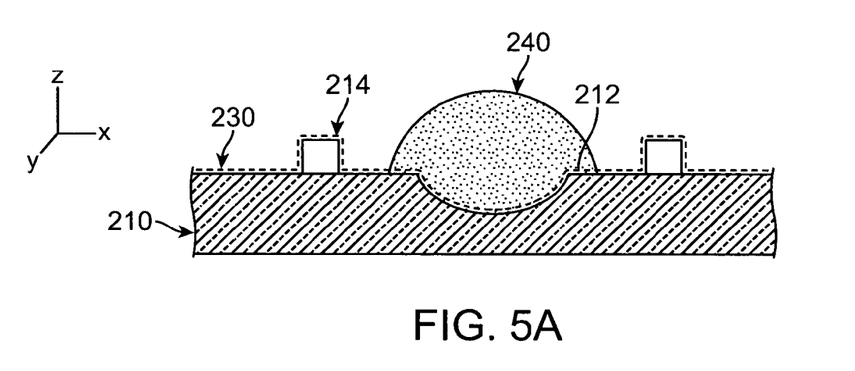
FIGS. 5A to 5C illustrate stages in a method of making a micro-optical element according to an embodiment of the present invention.
Figure 5B:
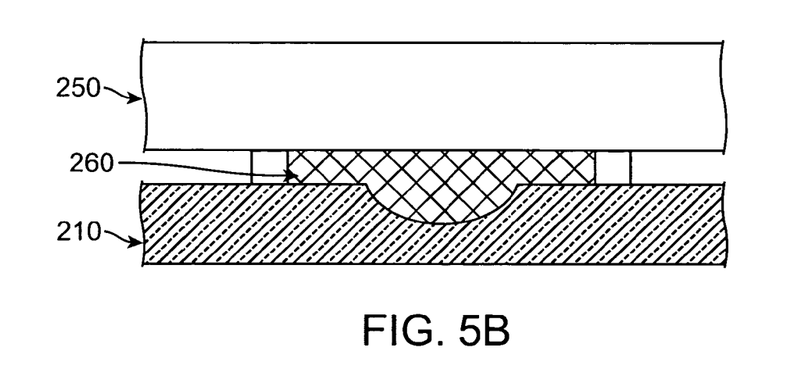
Figure 5C:
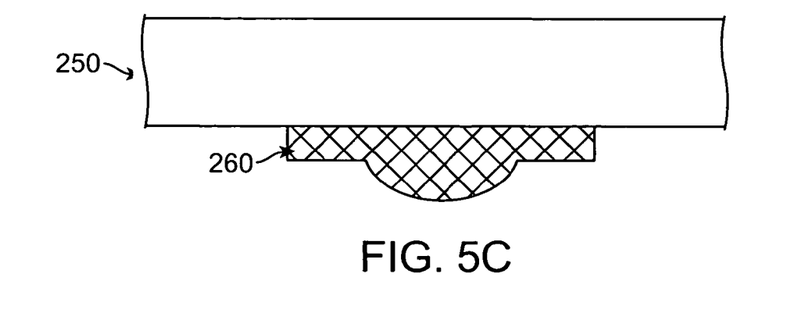

For example, as shown in FIGS. 5A and 5B, a master substrate 210 may include a concave lens 212 having a desired prescription and a spacer structure 214 having a desired height, i.e., extending in the Z direction. As can bee seen in FIG. 5B, this spacer structure 214 may surround the concave lens 212. Referring again to FIG. 5A, a release layer 230 may be provided on the master substrate 210, and a replication material 240 may be dispensed at a volume determined by the spacer structure 214 and the concave lens 212. Then, as shown in FIG. 5C, a support substrate 250 may be brought into contact with the replication material 240 and the spacer structure 214, and the replication material 240 may be cured to form a replica 260 including a base layer. Then, the replica 260 may be removed from the master substrate, as shown in FIG. 5D, while adhering to the support substrate 250. This replica 260 may then be used as is, or may be transferred into the support substrate 250 in accordance with known techniques to form a final optical element.

A height and diameter of the base layer may be determined by the optical design, the viscosity of the replication material used, and a distance between adjacent lenses, when a plurality of replicas is to be produced. The spacer structure 214 on the master substrate 210 may correspond to dicing lanes of the support substrate 250, such that no replication material is on at least an upper surface of the support substrate 250 when the support substrate is to be singulated.

Figure 6A:
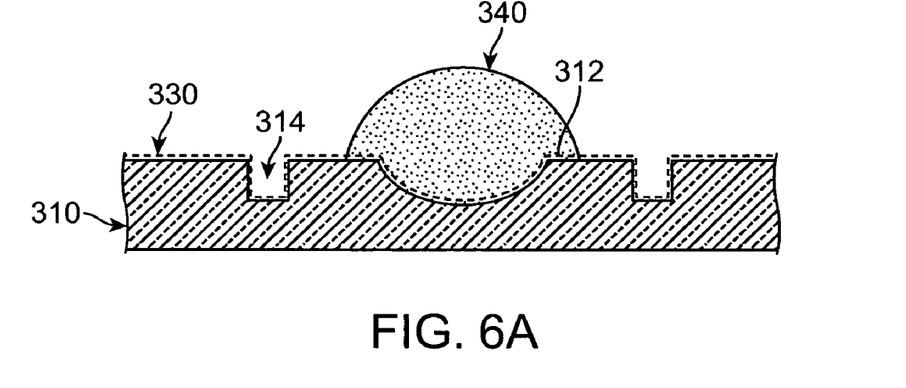
FIGS. 6A to 6C illustrate stages in a method of making a micro-optical element according to an embodiment of the present invention.
Figure 6B:
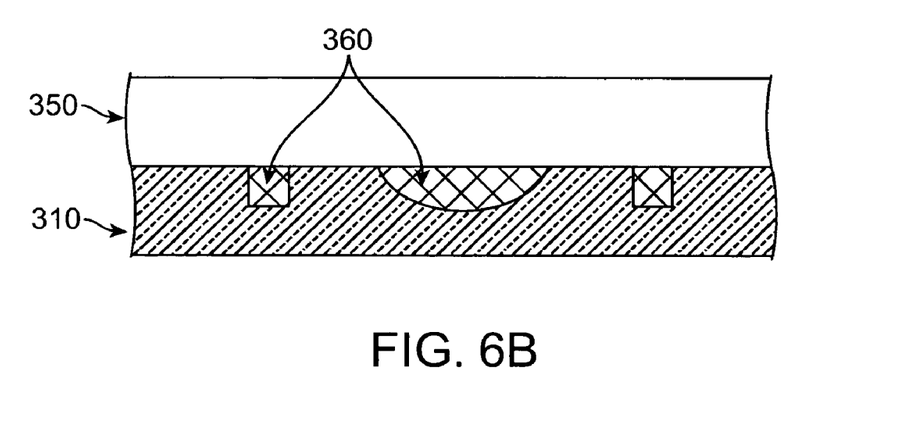
Figure 6C:
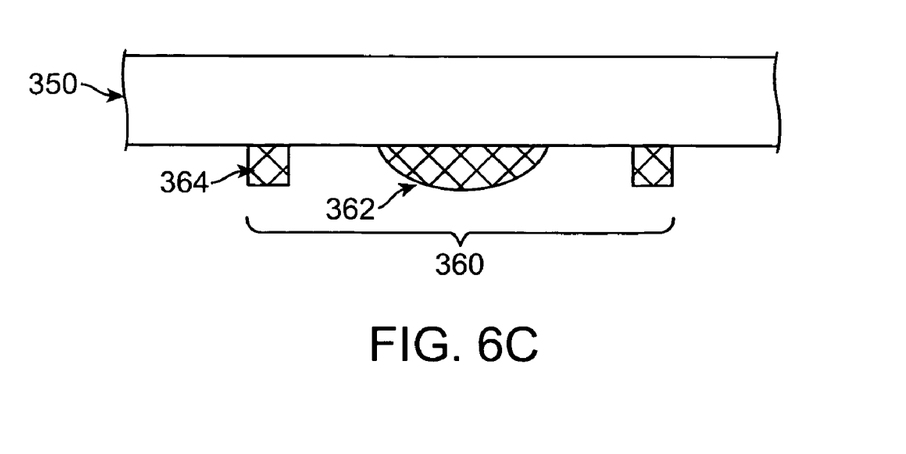

Referring to FIGS. 6A to 6C, when substantially no base layer is desired, trenches 314 having a depth may surround a concave lens mold 312 in a master substrate 310. A depth and a width of the trench 314 may depend on a viscosity of a material to be used, distance from the concave lens mold 312 and a desired height of the base layer. As shown in FIG. 6A, a release layer 330 may be provided on the master substrate 310, and a replication material 340 may be dispensed in the concave lens mold 312. Then, as shown in FIG. 6B, a support substrate 350 may be brought into contact with the replication material 340 and the master substrate 310. The replication material 340 that is in excess of the replication material needed to fill the concave lens mold 312 may fill the trench 314. The replication material 340 may be cured to form a replica 360 including a lens 362 and a standoff 364. Then, the replica 360 may be removed from the master substrate 310, as shown in FIG. 6C, while adhering to the support substrate 350. This replica 360 may then be used as is, or may be transferred into the support substrate 350 in accordance with known techniques to form a final optical element.

If the trenches 314 are merely to serve as a repository for excess replication material 340, then an opaque material may be selectively provided on a back surface of the master substrate 310 preventing UV light from reaching the replication material 340 in the trench 314, and the replication material 340 may be exposed through the master substrate 310. Alternatively, an opaque material may be selectively provided on a back surface of the support substrate 350 preventing UV light from reaching the replication material 340 in the trench 314, and the replication material 340 may be exposed through the support substrate 350.

Figure 7A:
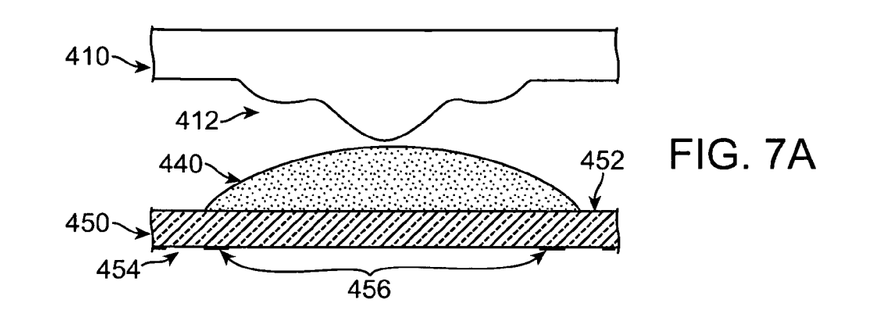
FIGS. 7A to 7E illustrate stages in a method of making a micro-optical element according to an embodiment of the present invention.
Figure 7B:
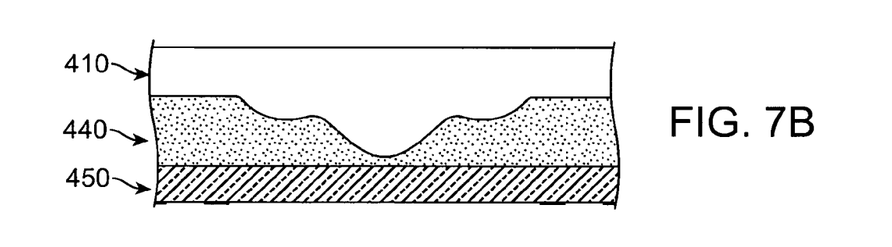
Figure 7C:
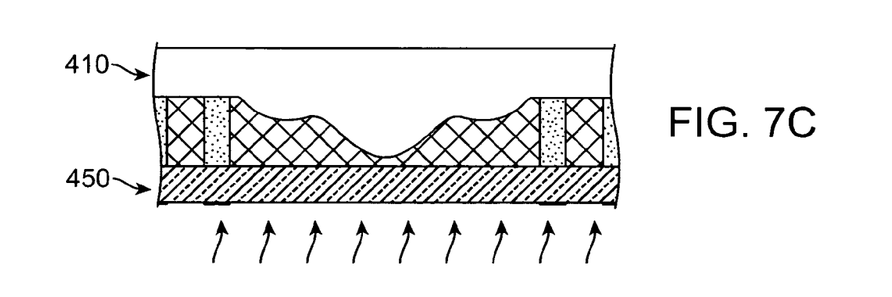
Figure 7D:
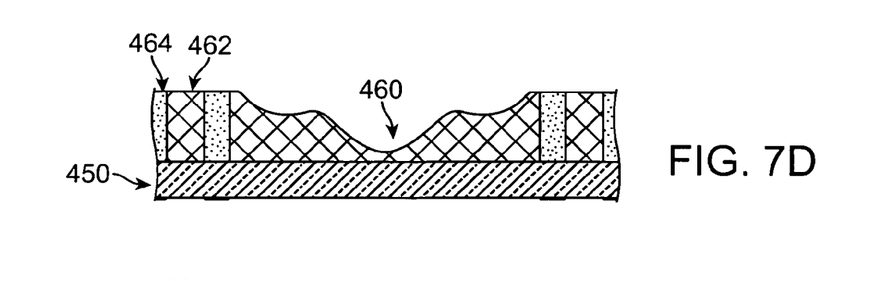
Figure 7E:
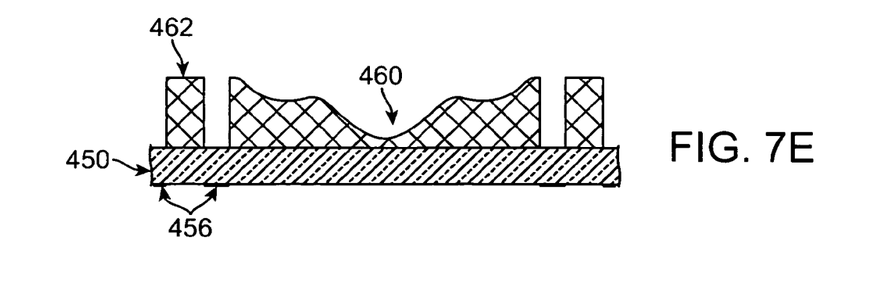

Another method for replicating protruding features on a surface of a support substrate supporting the lens replica simultaneous with replicating the lens is illustrated in FIGS. 7A to 7E. Here, a replication material 440 may be on a top surface 452 of a support substrate 450, and a master substrate 410, here including a convex lens mold 412, may be brought into contact with the replication material 440 on the support substrate 450. A bottom surface 454 of the support substrate 450 may include a mask 456 that is opaque to wavelengths to be used to cure the replication material 440, e.g., a metal mask. The replication material 440 may then be cured through the support substrate 450, as shown in FIG. 7C. The master substrate 410 may then be removed, leaving the cured lens 460, cured standoffs 462, and uncured portions 464 corresponding to the mask 456 on the bottom surface 454 of the support substrate 450, as shown in FIG. 7D. These uncured portions may then be readily removed, leaving just the lens 460 and the features 462. The mask 456 may remain as a final element, e.g., may serve as an aperture stop, an alignment feature, and so forth.

Figure 8A:
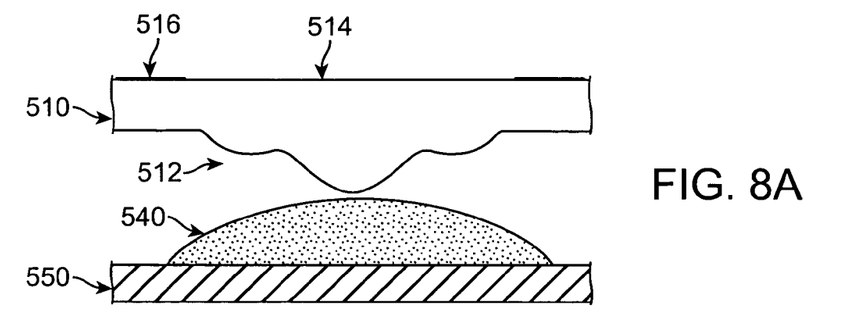
FIGS. 8A to 8E illustrate stages in a method of making a micro-optical element according to an embodiment of the present invention.
Figure 8B:
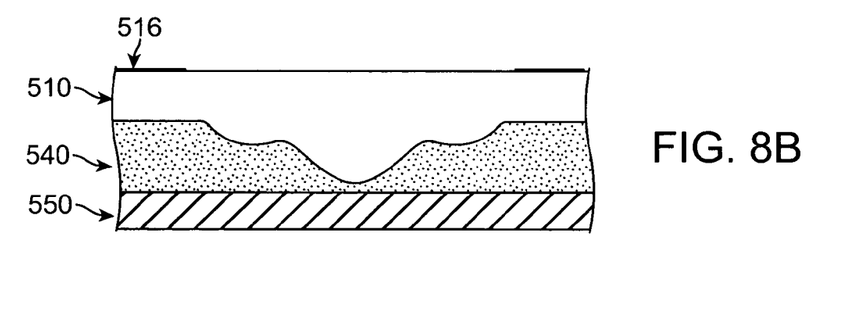
Figure 8C:
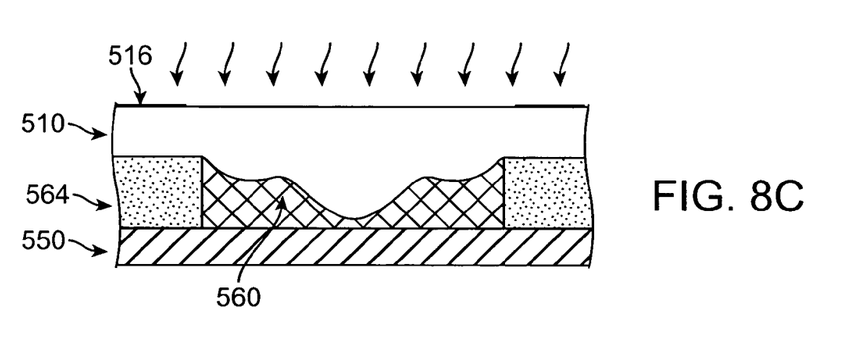
Figure 8D:
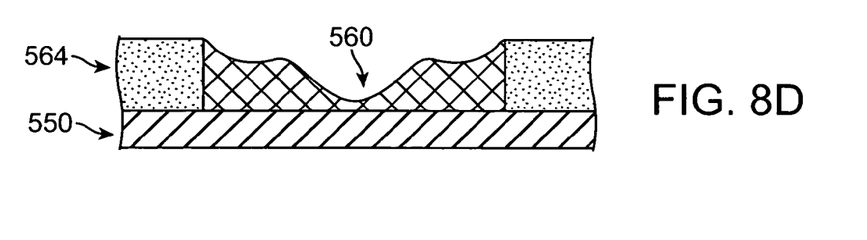
Figure 8E:
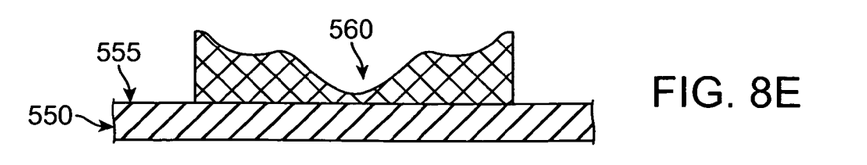

Alternatively, as shown in FIG. 8A, if a master substrate 510, including a convex lens mold 512, is made of a transparent material, and a replication material 540 on a support substrate 550 is to be cured through the master substrate 510, then a mask 516 may be provided on a rear surface 514 of the master substrate 510. Referring to FIG. 8B, the master substrate 510 may be brought into contact with the replication material 540, and the replication material 540 may be cured through the master substrate 510. The master substrate 510 may then be removed leaving a hardened lens 560 and uncured portions 564, corresponding to the mask 556 on the rear surface 514 of the master substrate 510, on the support substrate 510, as shown in FIG. 8D. These uncured portions 564 may then be readily removed, leaving just the lens 560, as shown in FIG. 8E.

If protruding features, e.g., for alignment and/spacing, are not needed, the mask 516 may correspond to the periphery of the lens 560. The removal of the replication material 540 in the periphery may facilitate mass production of a plurality of replicas by readily clearing dicing lanes 555, as shown in FIG. 8E, so that separation of the substrate having a plurality of replicas thereon may involve only separating through a support substrate 550, i.e., without affecting the replica, which may delaminate if material for the replica extends from the replica into the dicing lane due to stresses incurred during separation. Of course, masks for providing either configuration, i.e., with or without protruding features, may be formed on the master and/or support substrates.

While FIGS. 7A to 8C illustrate configurations having masks for preventing curing of some of the replication material at specific positions, the mask may be provided anywhere between the curing source and the replication material, e.g., on a side of the master substrate in contact with the replication material.

Opaque or optically absorbing material may also be sandwiched between the support substrate and the replica, e.g., when the material is to provide an aperture stop. Currently, opaque material is typically provided outside the lens diameter after the lens has been replicated, since the opaque material may interfere with the curing of the replication material. The opaque or optically absorbing material for use in any embodiments may include, for example, a raw polyimide (e.g., Kapton® from DuPont Electronics), a pigmented (e.g., black) polyimide, another type of polymer (e.g., PSKTM 2000 from Brewer Science Specialty Materials), black chrome, another type of metal, anodized metal, dry film, ceramic, a pigmented, e.g., black, adhesive, glass, silicon, photosensitive glass (e.g., Foturan® from Schott AG or PEG3 from Hoya Corporation of Tokyo, Japan), etc. These opaque or optically absorbing materials may be provided in sheets, i.e., in solid form, and punched, drilled, or otherwise patterned without necessarily using lithographic techniques. These opaque materials may be flexible, conformal and/or compressible in the stacking direction, which may help facilitate the securing thereof to a surface that is not substantially planar, e.g., has surface roughness or partially covers a feature on the surface. Alternatively, the opaque material may be spun, coated or laminated onto the support substrate or on the master.

Figure 9A:
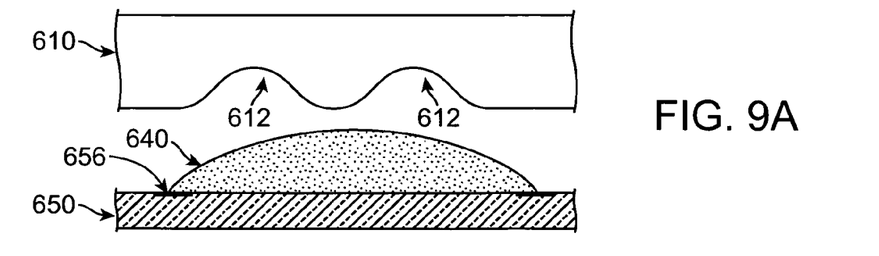
FIGS. 9A to 9C illustrate stages in a method of making a micro-optical element according to an embodiment of the present invention.
Figure 9B:
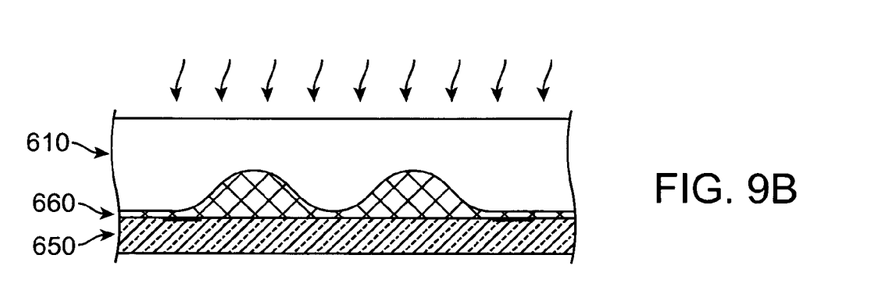
Figure 9C:
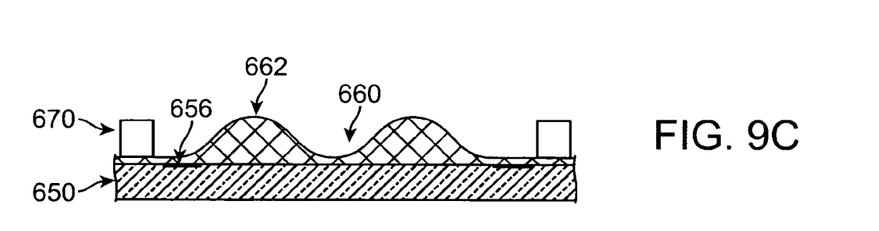

As illustrated in FIGS. 9A and 9B, a master substrate 610, including concave lenses 612, may be transparent to wavelengths used for curing a replication material 640. The replication material 640 may be provided on a support substrate 650, which includes opaque material 656 thereon. As can be seen in FIGS. 9A and 9B, the replication material 640 may initially only contact a portion of the opaque material 656, but after the master substrate 610 has been brought into contact with the replication material 640, the replication material 640 may completely cover the opaque material. Referring to FIG. 9B, the replication material 640 may be cured through the master substrate 610 to form a replica 660 including lens portions 662. Referring to FIG. 9C, the master substrate 610 may be removed, and a die attach film (DAF) 670 or other adhesive may be provided surrounding the replica 660.

Figure 9D:
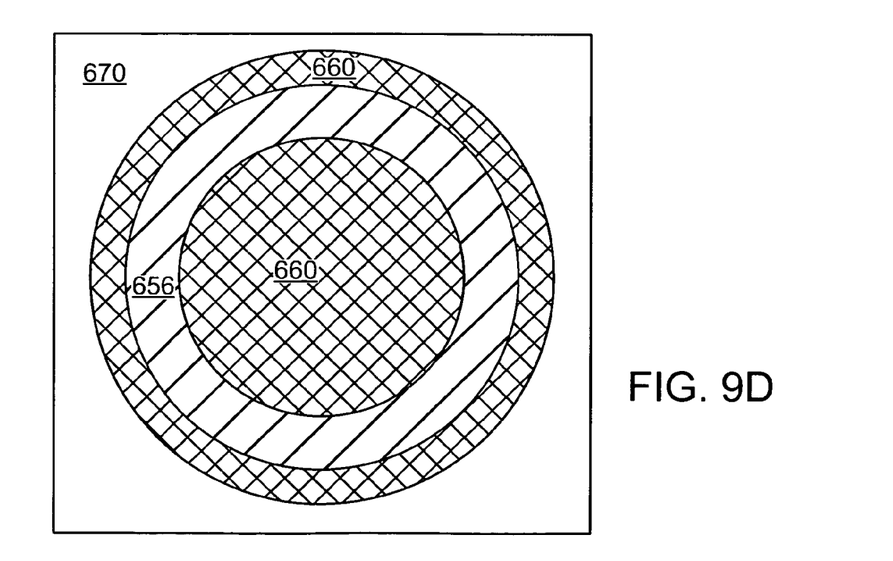
FIG. 9D illustrates a plan view of FIG. 9C.

FIG. 9D illustrates a plan view of FIG. 9C. As shown therein, the opaque material 656 may form an annular aperture stop around the lens portions 662 of the replica 660, while not extending to the DAF 670. Limiting the opaque material 656 to this region, i.e., preventing the opaque material from extending into dicing lanes, may aid in singulating the micro-optical device, i.e., may simplify separation into individual dies and reduce likelihood of delamination of the replica 660. However, the present embodiment may allow an aperture stop of any size, shape and positioning to be provided on the support substrate 650 prior to providing the replication material 640. As also shown in FIGS. 9C and 9D, the replica 660 may extend over the support substrate 650, e.g., including over the opaque material and under the DAF 670. However, in accordance with previous embodiments of the present invention, masks may be used on the master and/or the support substrates to eliminate the replica 660 under the DAF 670, which may further simplify separation into individual dies and reduce likelihood of delamination of the replica 660.

Figure 9E:
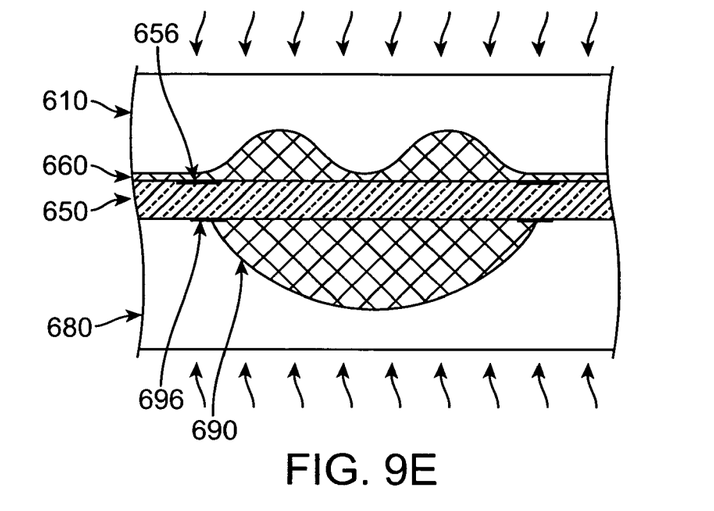
FIG. 9E a cross-sectional view of an alternative stage to FIG. 9B.
Figure 9F:
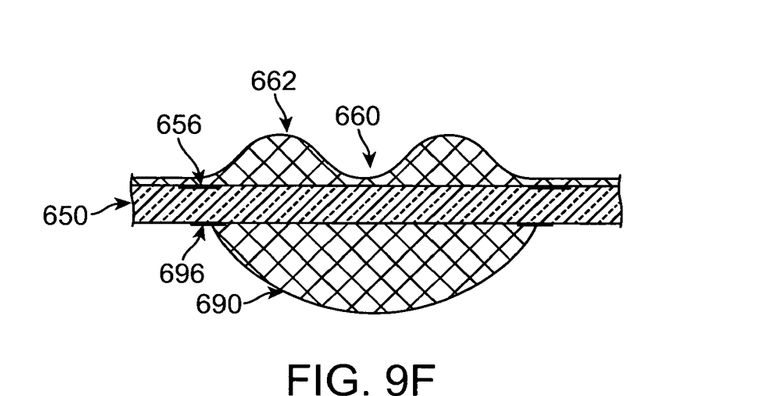
FIG. 9F illustrates a cross-sectional view of an alternative stage to FIG. 9C.

FIGS. 9E and 9F illustrate alternative stages in accordance with an embodiment. As illustrated in FIGS. 9E and 9F, opaque material 656, 696 may be provided on both sides of the support substrate 650 and may be sandwiched between the support substrate 650 and replicas 660, 690 on either side of the support substrate 650. As illustrated in FIG. 9E, the replicas 660, 690 may be formed using respective master substrates 610, 680, and the curing of replication material to form the replicas 660, 690 may be performed through respective master substrates 610, 680, so that the opaque material does 656, 696 does not interfere with the curing. Again, replication material outside the lens portions 662 maybe removed using appropriate masks along with the master substrates 610, 680.

Figure 9G:
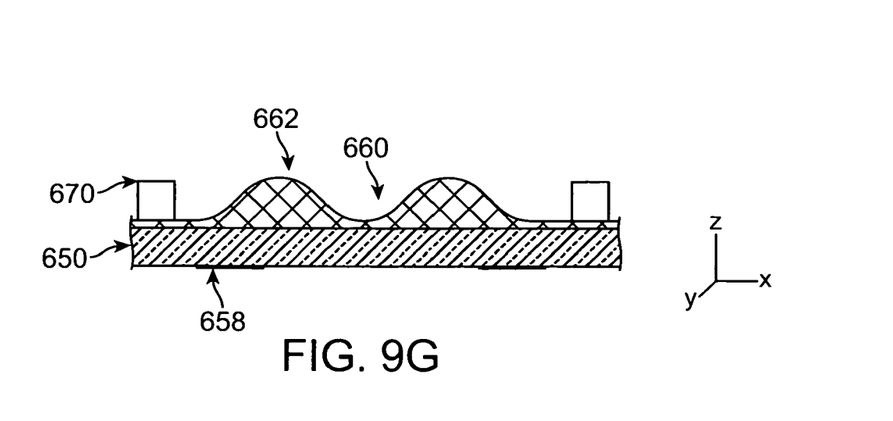
FIG. 9G illustrates a cross-sectional view of an alternative stage to FIG. 9C.

Another alternative, as illustrated in FIG. 9G, opaque material 658 may be provided on a bottom of the support substrate 650, i.e., opposite the lens portions 662. Since the opaque material 658 is still aligned with the lens portions 662 along a z-direction, the replication material may still be cured from above to insure proper formation of the lens portions 662.

Another alternative, in which the opaque material is on a top surface of the replicated lens, is illustrated in FIGS. 10A to 10D. This may allow more flexible curing of the replication material, i.e., without worrying about the effect of opaque material already present before curing, and increase available replication materials. Further, the lack of opaque material may facilitate double-sided replication, e.g., by requiring only a single alignment of top and bottom stamps to one another on either side of a support substrate.

Figure 10A:
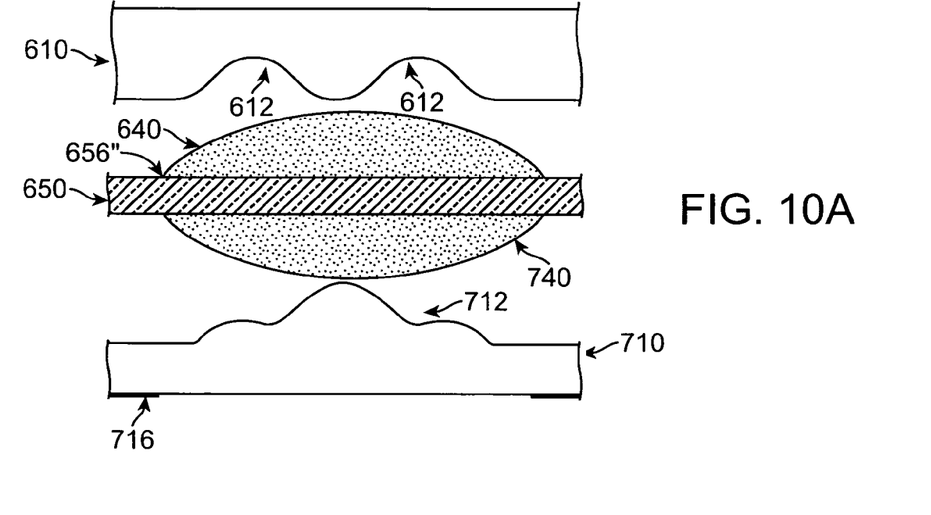
FIG. 10A to 10D illustrate stages in a method of making a micro-optical element according to an embodiment of the present invention.

As illustrated in FIG. 10A, a first surface of the support substrate 650, without the opaque material 656 thereon, may be provided with replication material 640 to be stamped by the master substrate 610, while a second surface of the support substrate 650 may be provided with replication material 740 to be stamped with another master substrate 710. In the particular example illustrated, the master substrate 610 includes concave lenses 612 and the master substrate 710 includes a convex lens 712, but embodiments are not limited thereto, and any master substrate may be used. The master substrate 710 may include opaque material 716 if not all of the replicated material 740 is to be cured.

Figure 10B:
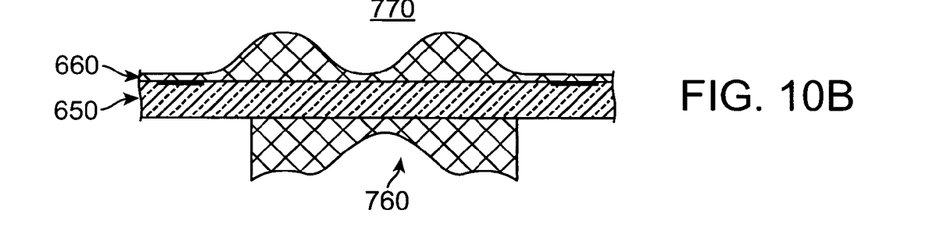

Then, the master substrates 610, 710 may be brought into contact with the respective replication materials 640, 740, and cured to form a double sided element 770 including replicated lenses 660, 760 as illustrated in FIG. 10B. The double sided element 770 may further reduce the vertical height in a stack for use in, for example, optical heads, cameras, and so forth.

Figure 10C:
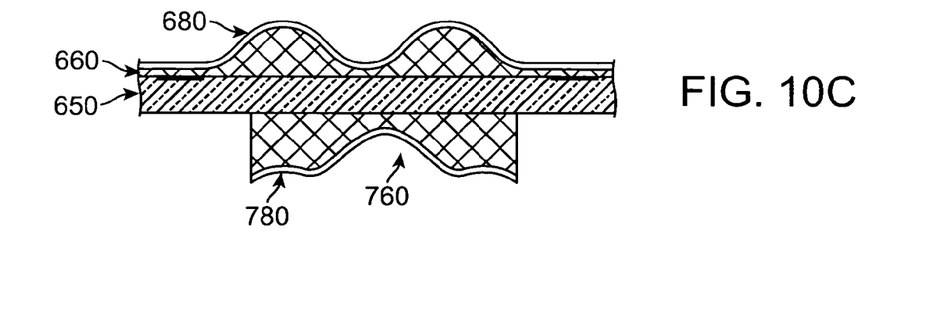

Then, as illustrated in FIG. 10C, one or both of the replicated elements 660, 760 may be provided, e.g., coated, with an opaque material, e.g., metal, such as chromium, black silicon, anodized aluminum, and so forth. How the opaque material will be patterned may depend on, for example, the opaque material used, the replication material used, availability of etchants for effectively removing the opaque material without affecting the underlying replication material, the availability of suitable lift-off materials, i.e., lift-off materials that will allow portions of the opaque material to be removed, while leaving opaque material secured to the replicated lenses, and so forth. For example, lift-off or etching, e.g., wet etching, may be used. If lift-off materials are employed, such materials may be any material that will allow lift-off with resist developer, not solvents.

Figure 10D:
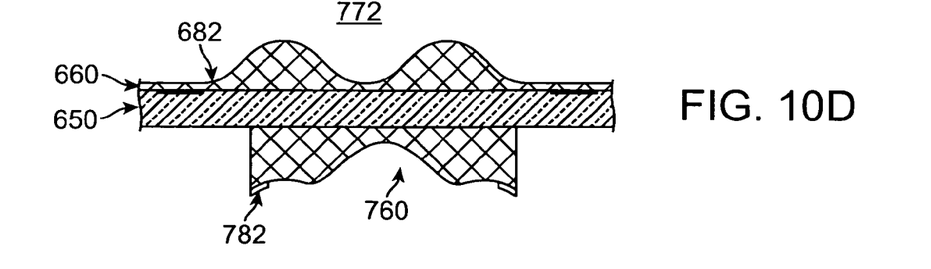

After appropriate patterning of the opaque material 680, 780 is completed, a final element 772 having opaque material patterns 682, 782 may be realized, as illustrated in FIG. 10D. Again, the opaque material patterns 682, 782 are still in aligned with lens portions along a z-direction.

It is further noted that the replication materials 640, 740, may be the same or different, the curing mechanisms therefore may be the same or different, the opaque materials 680, 780 provided thereon may be the same or different, and the patterning thereof may be the same or different.

Figure 11A:
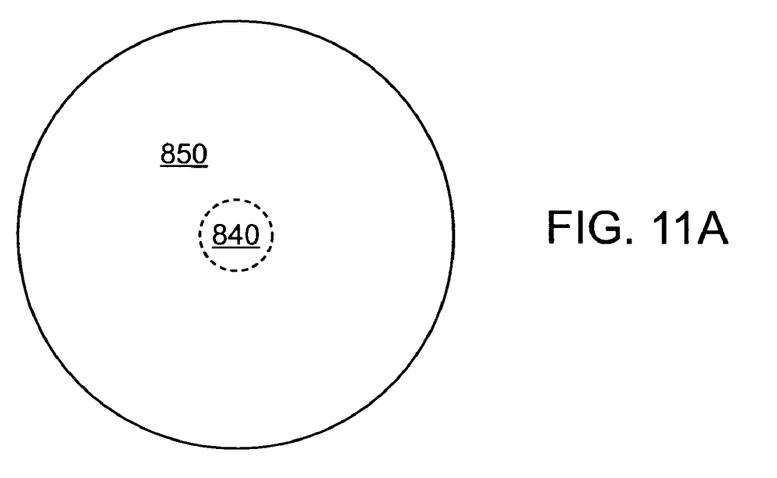
FIG. 11A illustrates a schematic plan view of a wafer on which a plurality of replicas may be created and a replication material provided thereon according to an embodiment of the present invention.
Figure 11B:
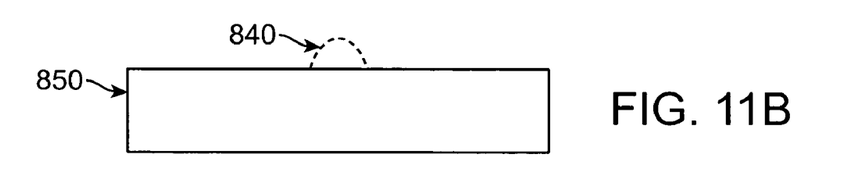
FIG. 11B illustrates a schematic side view of FIG. 11A.

While the above embodiments have illustrated provision of the replication material for each die as individual blobs, e.g., using an array of syringes, when created on a wafer level, the replication for all dies may be provided on the wafer as a single blob. For example, as illustrated in FIGS. 11A and 11B, a wafer 850 may have replication material 840 provided thereon, e.g., in a center of the wafer 840. The height and width of the replication material 840 may depend on various parameters, e.g., the viscosity of the replication material used, the material of the substrate. When a master substrate is brought into contact with the replication material 840, the replication material 840 may be sufficiently spread over the entire wafer 850 to form individual replicas across the wafer 850.

Figure 11C:
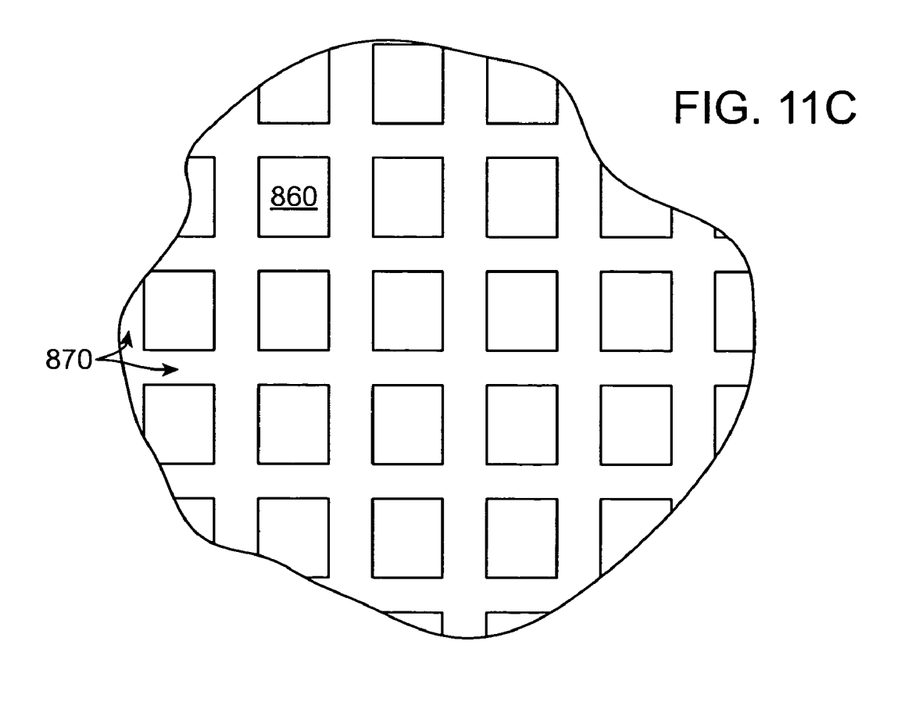
FIG. 11C illustrates a schematic partial plan view of a plurality of replicas to be separated.

FIG. 11C illustrates a schematic partial plan view of a plurality of replicas 860 formed in accordance with any of the embodiments of the present invention after the master substrate has been brought into contact with the wafer 850 and the replication material has been cured. As shown therein, the replicas 860 may remain outside the dicing lanes 870, so when the replicas 860 are singulated, they are not directly stressed by the separation.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of forming a micro-optical lens, the method comprising: providing a replication material between a support substrate and a master substrate, the master substrate having a first surface including a micro-optical lens mold and at least one trench spaced apart from and surrounding the micro-optical lens mold therein, the micro-optical lens mold and the trench being completely separated from each other; planarizing the replication material; bringing the support substrate towards the first surface of the master substrate; and curing the replication material to form a replica including a lens.

2. The method as claimed in claim 1, wherein:
planarizing includes application of a heated flat element to the replication material; and
curing includes hardening of the planarized replication material.

3. The method as claimed in claim 1, further comprising etching the replica into the support substrate.

4. The method as claimed in claim 1, wherein curing the replication material includes forming a standoff surrounding the lens.

5. The method as claimed in claim 1, wherein, during curing, light is prevented from being incident on the replication material in the trench.

6. The method as claimed in claim 5, further comprising, after curing:
removing the master substrate; and
removing uncured replication material from the support substrate.

7. The method as claimed in claim 1, wherein the master substrate is part of a master wafer.

8. The method as claimed in claim 1, wherein the micro-optical lens mold is a concave micro-optical lens mold.

9. The method as claimed in claim 8, further comprising removing at least a portion of the replication material from the support substrate, such that at least a portion of the replication material remains within the concave micro-optical lens mold of the master substrate.

10. The method as claimed in claim 8, wherein providing the replication material includes overfilling the concave micro-optical lens mold.

11. The method as claimed in claim 10, wherein, during planarizing, the trench is filled with the replication material.

12. The method as claimed in claim 11, wherein planarizing includes bringing a planar surface into contact with the replication material overfilling the concave micro-optical lens mold.

13. The method as claimed in claim 12, wherein the planar surface is part of the support substrate.

14. The method as claimed in claim 1, wherein providing the master substrate with the micro-optical lens mold and trench includes forming the trench a predetermined distance away from the micro-optical lens mold, such that a portion of a flat surface of the master substrate is between and separates the micro-optical lens mold and the trench.

15. The method as claimed in claim 4, wherein curing the replication material includes forming the standoff to be spaced apart from the lens, such that the standoff and the lens are completely separated from each other.

16. A method of making a micro-optical device, comprising:
providing a replication material between a support substrate and a first surface of a master substrate having structural features for forming a micro-optical lens, at least one of the support substrate and the master substrate having a mask;
applying pressure to at least one of the support substrate and the master substrate;
curing the replication material to form a replica including the micro-optical lens and a standoff surrounding the micro-optical lens, curing including providing light through the surface having the mask; and
removing the support substrate including the replica, wherein the mask corresponds a region surrounding the micro-optical lens between the micro-optical lens and the standoff.

17. The method as claimed in claim 16, wherein the curing includes providing light through the master substrate.

18. The method as claimed in claim 17, wherein the master substrate includes one or more of PDMS and PTFE.

19. The method as claimed in claim 16, further comprising removing any replication material not cured during the curing.

20. The method as claimed in claim 16, wherein the curing includes providing light through the support substrate.

21. The method as claimed in claim 20, wherein the replica including the micro-optical lens is formed to overlap the mask, the mask including an opaque material.

22. The method as claimed in claim 16, wherein the mask is on a surface opposite that contacting the replication material.

23. The method as claimed in claim 16, wherein the mask is on a surface of the support substrate contacting the replication material.

24. The method as claimed in claim 16, wherein curing the replication material to form the replica including the micro-optical lens and the standoff includes forming a space between the micro-optical lens and the standoff.

25. The method as claimed in claim 24, wherein providing at least one of the support substrate and the master substrate with the mask includes positioning the mask to overlap a region of the space between the micro-optical lens and the standoff.

26. The method as claimed in claim 16, wherein curing the replication material to form the replica including the micro-optical lens and the standoff includes forming cured micro-optical lens and standoff.

27. The method as claimed in claim 26, wherein curing the replication material to form the replica including the micro-optical lens and the standoff includes forming the cured standoff with a substantially flat surface facing the master substrate.

\* \* \* \* \*